United States Patent
Jing et al.

(10) Patent No.: US 12,342,367 B2
(45) Date of Patent: Jun. 24, 2025

(54) NETWORK DEVICE ROLE SELF-ADAPTIVE METHOD AND APPARATUS

(71) Applicant: CHINA IWNCOMM CO., LTD., Shaanxi (CN)

(72) Inventors: Jingtao Jing, Shaanxi (CN); Guoqiang Zhang, Shaanxi (CN); Yunlong Ma, Shaanxi (CN); You Gai, Shaanxi (CN); Huanxi Wang, Shaanxi (CN)

(73) Assignee: CHINA IWNCOMM CO., LTD., Shaanxi (CN)

( * ) Notice: Subject to any disclaimer, the term of this patent is extended or adjusted under 35 U.S.C. 154(b) by 351 days.

(21) Appl. No.: 17/913,484

(22) PCT Filed: Mar. 11, 2021

(86) PCT No.: PCT/CN2021/080099
§ 371 (c)(1),
(2) Date: Sep. 22, 2022

(87) PCT Pub. No.: WO2021/197011
PCT Pub. Date: Oct. 7, 2021

(65) Prior Publication Data
US 2023/0135263 A1    May 4, 2023

(30) Foreign Application Priority Data
Apr. 2, 2020  (CN) .......................... 202010255018.1

(51) Int. Cl.
*H04W 72/56*   (2023.01)
*H04W 48/16*   (2009.01)

(52) U.S. Cl.
CPC ........... *H04W 72/56* (2023.01); *H04W 48/16* (2013.01)

(58) Field of Classification Search
CPC ..... H04W 72/56; H04W 48/16; H04W 40/24; H04W 12/06; H04W 12/71;
(Continued)

(56) References Cited

U.S. PATENT DOCUMENTS

| 8,730,884 B2 * | 5/2014 | Kim ..................... H04B 7/0452 370/329 |
| 9,974,040 B1 | 5/2018 | Chu et al. |

(Continued)

FOREIGN PATENT DOCUMENTS

| CN | 101958890 A | 1/2011 |
| CN | 102594696 A | 7/2012 |

(Continued)

OTHER PUBLICATIONS

Office Action received for Korean Patent Application No. 10-2022-7034007, mailed on Dec. 29, 2024, 15 pages (7 pages of English Translation and 8 pages of Original Document).

(Continued)

*Primary Examiner* — Kan Yuen
(74) *Attorney, Agent, or Firm* — ArentFox Schiff LLP; Michael Fainberg (57) ABSTRACT

A network device role self-adaptive method and apparatus are provided. Specifically, a first network device and a neighbor network device both determine their respective priority according to information including a connection result between the corresponding network device itself and a server; the first network device receives a second start frame which is sent by the neighbor network device and comprises the priority of the neighbor network device, and then determines whether its own priority and the priority of the neighbor network device meet preset conditions; and if yes, when the priority of the first network device is higher than the priority of the neighbor network device, the first (Continued)

network device determines its own role as an authentication access controller, and when the priority of the first network device is lower than the priority of the neighbor network device, the first network device determines its own role as a request device.

19 Claims, 3 Drawing Sheets

(58) Field of Classification Search
CPC ......... H04W 28/0284; H04W 28/0942; H04W 24/02; H04W 74/0808; H04W 74/0816; H04W 76/15; H04W 84/12; H04W 88/08; H04W 72/52; H04L 49/201; H04L 63/0876; H04L 47/125
See application file for complete search history.

(56) References Cited

U.S. PATENT DOCUMENTS

| | | | |
|---|---|---|---|
| 2009/0327504 A1* | 12/2009 | Takasu | H04W 12/06 709/229 |
| 2010/0064346 A1* | 3/2010 | Falk | H04W 12/069 726/3 |
| 2016/0044516 A1* | 2/2016 | Hedayat | H04W 16/14 370/329 |

FOREIGN PATENT DOCUMENTS

| | | |
|---|---|---|
| CN | 106130819 A | 11/2016 |
| CN | 106161272 A | 11/2016 |
| CN | 106878083 A | 6/2017 |
| CN | 107154864 A | 9/2017 |
| CN | 109194521 A | 1/2019 |
| EP | 1890518 A2 | 2/2008 |
| KR | 10-2008-0015731 A | 2/2008 |
| KR | 10-2017-0076392 A | 7/2017 |
| WO | 2006020437 A1 | 2/2006 |
| WO | 2009014902 A1 | 1/2009 |

OTHER PUBLICATIONS

Office Action received for Chinese Patent Application No. 202010255018.1, mailed on Jan. 23, 2025, 7 pages (Original Document only).

* cited by examiner

NETWORK DEVICE ROLE SELF-ADAPTIVE METHOD AND APPARATUS

CROSS REFERENCE TO RELATED APPLICATIONS

The present disclosure is a National Stage of International Application No. PCT/CN2021/080099, filed on Mar. 11, 2021, which claims the priority of Chinese Patent Application No. 202010255018.1, filed on Apr. 2, 2020 and entitled "NETWORK DEVICE ROLE SELF-ADAPTIVE METHOD AND APPARATUS", both of which are incorporated in their entireties herein by reference.

FIELD

The present disclosure relates to the technical field of network communication security, in particular to a network device role self-adaptive method and apparatus.

BACKGROUND

In communication network, in order to guarantee that terminal devices accessing the network belong to legitimate users, identity authentication of the terminal devices is required. At present, methods for identity authentication of the terminal devices employ a certificate-based tri-element authentication mode and a preshared key tri-element authentication mode. In the above methods, a request device, an authentication access controller and a trusted third-party authentication server are usually included. The request device sends identity information to the authentication server through the authentication access controller, and the authentication server authenticates the identity information of the request device.

During identity authentication, when accessing a switch, the terminal devices act as the request device, while the switch acts as the authentication access controller for identity authentication.

SUMMARY

In a first aspect, an embodiment of the present disclosure provides a network device role self-adaptive method. The method includes:
  receiving, by a first network device, a second start frame sent by a neighbor network device, where the second start frame includes a priority of the neighbor network device, and the priority of the neighbor network device is determined by the neighbor network device according to information including a result of connection between the neighbor network device and a server;
  determining, by the first network device, whether a priority of the first network device and the priority of the neighbor network devices satisfy a preset condition, where the priority of the first network device is determined by the first network device according to information including a result of connection between the first network device and the server, and the preset condition includes the priority of the first network device being a non-initial level and the priority of the neighbor network device being a non-initial level; and
  determining, by the first network device, a role of the first network device as an authentication access controller in response to the preset condition being satisfied and the priority of the first network device being higher than that of the neighbor network device;
  determining, by the first network device, a role of the first network device as a request device in response to the preset condition being satisfied and the priority of the first network device being lower than that of the neighbor network device.

In some embodiments, the determining the priority of the first network device includes:
  sending a first discovery message to the server by the first network device;
  repeatedly sending the first discovery message to the server in response to the first network device not receiving, within a preset time, a first response message sent by the server;
  setting the priority of the first network device to highest priority by the first network device in response to the first network device receiving, within the preset time, a first response message sent by the server.

In some embodiments, before the sending a first discovery message to the server by the first network device, the method further includes:
  setting, by the first network device, the priority of the first network device to an initial level, and sending a first start frame to the neighbor network device, where the first start frame includes information on the priority of the first network device being the initial level;
  adjusting the priority of the first network device, and sending the first discovery message to the server by the first network device.

In some embodiments, before the sending a first start frame to the neighbor network device by the first network device, the method further includes:
  broadcasting a neighbor data packet by the first network device, where the neighbor data packet includes a media access control (MAC) address and a device type of the first network device; and
  receiving, by the first network device, an acknowledgment message sent after the neighbor network device receives the neighbor data packet, where the acknowledgment message includes a MAC address and a device type of the neighbor network device.

In some embodiments, in response to the first network device receiving, within the preset time, the first response message sent by the server and the first network device has link aggregation ports, the determining the priority of the first network device includes:
  acquiring a role information of the link aggregation ports by the first network device; and
  setting the priority of the first network device to the highest priority by the first network device in response to the role information of the link aggregation ports being an authentication access controller.

In some embodiments, the acquiring role information of the link aggregation ports by the first network device includes:
  determining a link aggregation group to which the link aggregation ports belong; and
  acquiring a role information of link aggregation ports in an access state from the link aggregation group.

In some embodiments, the determining the priority of the neighbor network device includes:
  receiving, by the neighbor network device, the first start frame sent by the first network device, and setting the priority of the neighbor network device to an initial level according to the first start frame in response to the priority of the neighbor network device being the non-initial level;

sending a second discovery message to the server by the neighbor network device;

repeatedly sending the second discovery message to the server in response to the neighbor network device not receiving, within a preset time, a second response message sent by the server;

setting the priority of the neighbor network device to highest priority by the neighbor network device in response to the neighbor network device receiving, within the preset time, a second response message sent by the server.

In some embodiments, before the repeatedly sending the second discovery message to the server by the neighbor network device, sending, by the neighbor network device, the second start frame to the first network device, the second start frame including information on the priority of the neighbor network device being the initial level; and adjusting, by the neighbor network device, the priority of the neighbor network device, and sending the second discovery message to the server.

In some embodiments, in response to the neighbor network device receiving, within the preset time, the second response message sent by the server and the neighbor network device has link aggregation ports, the determining the priority of the neighbor network device includes:

acquiring a role information of the link aggregation ports by the neighbor network device; and setting the priority of the neighbor network device to the highest priority by the neighbor network device in response to the role information of the link aggregation ports being an authentication access controller.

In some embodiments, the acquiring role information of the link aggregation ports by the neighbor network device includes:

determining a link aggregation group to which the link aggregation ports belong; and acquiring a role information of link aggregation ports in an access state from the link aggregation group.

In some embodiments, after the priority of the neighbor network device is determined, the neighbor network device sends the second start frame including the priority of the neighbor network device to the first network device.

In some embodiments, after the setting the priority of the first network device to highest priority by the first network device, the neighbor network device receives the first start frame, including the priority of the neighbor network device being the highest priority, sent by the first network device, and sends the second start frame including the priority of the neighbor network device to the first network device.

In some embodiments, in response to the preset condition being satisfied and the priority of the first network device being equal to the priority of the neighbor network device, the method further includes:

determining the role of the first network device as the authentication access controller or the request device by the first network device according to a size relation between the MAC address of the first network device and the MAC address of the neighbor network device.

In some embodiments, in response to the preset condition not being satisfied, the method further includes:

setting, by the first network device, the priority of the first network device to the initial level, and sending the first start frame to the neighbor network device; and adjusting, by the first network device, the priority of the first network device, and sending the first discovery message to the server, so as to determine the priority of the first network device according to the information including the result of connection between the first network device and the server.

In a second aspect, some embodiments of the present disclosure provide a network device role self-adaptive apparatus. The apparatus is applied to a first network device, and includes:

a reception unit configured to receive a second start frame sent by a neighbor network device, where the second start frame includes a priority of the neighbor network device, and the priority of the neighbor network device is determined by the neighbor network device according to information including a result of connection between the neighbor network device and a server;

a determination unit configured to determine whether priority of the first network device and the priority of the neighbor network devices satisfy a preset condition, where the priority of the first network device is determined by the first network device according to information including a result of connection between the first network device and the server, and the preset condition includes the priority of the first network device being a non-initial level and the priority of the neighbor network device being a non-initial level;

a first determination unit configured to determine a role of the first network device as a request device in response to the preset condition being satisfied and the priority of the first network device being lower than that of the neighbor network device; and a second determination unit configured to determine a role of the first network device as an authentication access controller in response to the preset condition being satisfied and the priority of the first network device being higher than that of the neighbor network device.

In some embodiments, the apparatus further includes a sending unit and a setting unit, and the determining the priority of the first network device includes:

sending a first discovery message to the server by the sending unit; and repeatedly sending the first discovery message to the server in response to a first response message sent by the server not being received within preset time;

setting the priority of the first network device to highest priority by the setting unit in response to a first response message sent by the server being received within preset time.

In some embodiments, before the sending a first discovery message to the server by the sending unit, the setting unit sets the priority of the first network device to an initial level, and the sending unit sends a first start frame to the neighbor network device, the first start frame including information on the priority of the first network device being the initial level; and the setting unit adjusts the priority of the first network device after the sending unit sends the first start frame, and then the sending unit sends the first discovery message to the server.

In some embodiments, before the sending unit sends the first start frame to the neighbor network device, the apparatus further includes:

a broadcasting unit configured to broadcast a neighbor data packet, where the neighbor data packet includes a MAC address and a device type of the first network device; and the reception unit receives an acknowledgment message sent after the neighbor network device receives the neighbor data packet, where the acknowledgment message includes a MAC address and a device type of the neighbor network device.

In some embodiments, in response to the first network device receiving, within the preset time, the first response message sent by the server and the first network device has link aggregation ports, the apparatus further includes an acquisition unit, and the determining the priority of the first network device includes:
  acquiring a role information of the link aggregation ports by the acquisition unit; and
  setting the priority of the first network device to the highest priority by the setting unit in response to the role information of the link aggregation ports being an authentication access controller.

In some embodiments, the acquiring role information of the link aggregation ports by the acquisition unit includes:
  determining a link aggregation group to which the link aggregation ports belong; and
  acquiring a role information of link aggregation ports in an access state from the link aggregation group.

In some embodiments, after the setting the priority of the first network device to the highest priority by the setting unit, the sending unit sends a first start frame including the priority of the first network device being the highest priority to the neighbor network device.

In some embodiments, in response to the preset condition being satisfied and the priority of the first network device being equal to the priority of the neighbor network device, the apparatus further includes:
  a third determination unit configured to determine the role of the first network device as the authentication access controller or the request device according to a size relation between the MAC address of the first network device and the MAC address of the neighbor network device.

In some embodiments, in response to the preset condition not being satisfied, the setting unit sets the priority of the first network device to the initial level, and the sending unit sends the first start frame to the neighbor network device;
  the setting unit adjusts the priority of the first network device, and the sending unit sends the first discovery message to the server, such that the first network device determines the priority of the first network device according to the information including the result of connection between the first network device and the server.

In a third aspect, some embodiment of the present disclosure provide a network device role self-adaptive apparatus, where the apparatus is applied to a neighbor network device, and the apparatus includes:
  a sending unit configured to send a second start frame to a first network device; the second start frame includes priority of the neighbor network device, the priority of the neighbor network device being determined by the neighbor network device according to information including a result of connection between the neighbor network device and a server; the second start frame is used by the first network device to determine whether a priority of the first network device and the priority of the neighbor network device satisfy a preset condition, the preset condition including the priority of the first network device being a non-initial level and the priority of the neighbor network device being a non-initial level.

In some embodiments, the apparatus further includes a reception unit and a setting unit, and the determining the priority of the neighbor network device includes:
  receiving, by the reception unit, a first start frame sent by the first network device, where the first start frame includes information on the priority of the first network device being an initial level;
  setting the priority of the neighbor network device to an initial level by the setting unit in response to the priority of the neighbor network device being the non-initial level after the reception unit receives the first start frame;
  sending a second discovery message to the server by the sending unit;
  repeatedly sending the second discovery message to the server in response to a second response message sent by the server not being received within preset time;
  setting the priority of the neighbor network device to highest priority by the setting unit in response to a second response message sent by the server being received within preset time.

In some embodiments, before the repeatedly sending the second discovery message to the server, the sending unit sends the second start frame to the first network device, the second start frame including information on the priority of the neighbor network device being the initial level; and
  the setting unit adjusts the priority of the neighbor network device, and the sending unit sends the second discovery message to the server.

In some embodiments, in response to the neighbor network device receiving, within the preset time, the second response message sent by the server and the neighbor network device has link aggregation ports, the apparatus further includes an acquisition unit, and the determining the priority of the neighbor network device includes:
  acquiring a role information of the link aggregation ports by the acquisition unit; and
  setting the priority of the neighbor network device to the highest priority by the setting unit in response to the role information of the link aggregation ports being an authentication access controller.

In some embodiments, the acquiring role information of the link aggregation ports by the acquisition unit includes:
  determining a link aggregation group to which the link aggregation ports belong; and
  acquiring a role information of link aggregation ports in an access state from the link aggregation group.

In some embodiments, after the priority of the neighbor network device is determined, the sending unit sends the second start frame including the priority of the neighbor network device to the first network device.

In some embodiments, after the reception unit receives a first start frame, including the priority of the first network device being highest priority, sent by the first network device, the sending unit sends the second start frame including the priority of the neighbor network device to the first network device.

In some embodiments, the reception unit is further configured to receive a neighbor data packet broadcast by the first network device, where the neighbor data packet includes a MAC address and a device type of the first network device; and
  the sending unit is further configured to send an acknowledgment message to the first network device after the reception unit receives the neighbor data packet, where the acknowledgment message includes a MAC address and a device type of the neighbor network device.

In a fourth aspect, some embodiments of the present disclosure provides a network device. The network device includes: a processor and a memory; where the memory is configured to store an instruction or a computer program; and the processor is configured to execute the instruction or the computer program and execute the method in the first aspect.

In a fifth aspect, a computer readable storage medium is provided, and includes an instruction or a computer and when run on a computer, the instruction or the computer program causes the computer to execute the method in the first aspect.

DETAILED DESCRIPTION OF THE EMBODIMENTS

To make the above objectives, features and advantages of the present disclosure clearer and more comprehensible, the present disclosure will be further described below in detail with reference to the accompanying drawings and in conjunction with particular embodiments.

To facilitate understanding of a technical solution provided by the embodiments of the present disclosure, technologies related to the embodiments of the present disclosure will be firstly described below.

During research of a traditional network device role determination method, the inventor finds that when the terminal accesses the switch, the terminal naturally acts as the request device (REQ), and the switch acts as the authentication access controller (AAC). However, in the case of identity authentication of two network devices of peer-to-peer device types, such as two switches, roles may not be determined usually. If the network device in communication with an authentication server (AS) is fixed as the AAC, the other network device is fixed as the REQ; alternatively, if priority of two peer-to-peer network devices are configured in advance, roles are determined according to the priority, and the two methods above fixes the role of each network device, which leads to poor flexibility of network topology change. In a practical application, due to constraint from a network topology structure, the method may not adapt to actual application scenes with the network topology change.

Based on this, some embodiments of the present disclosure provide a network device role self-adaptive method. For any two network devices in network, that is, a first network device and a corresponding neighbor network device thereof, each network device determines priority thereof according to a result of connection between the network device and a server. The neighbor network device sends a second start frame including the priority thereof to the first network device, and the first network device determines whether the priority of the first network device and the priority of the neighbor network device satisfy a preset condition, and the preset condition includes the priority of the first network device being a non-initial level and the priority of the neighbor network device being a non-initial level. When the preset condition is satisfied, the first network device determines a role thereof according to a size relation between the priority of the first network device and the priority of the neighbor network device. Optionally, the role of the first network device is determined as an authentication access controller when the priority of the first network device is higher than that of the neighbor network device. When the priority of the first network device is lower than that of the neighbor network device, the role of the first network device is determined as the request device. When the priority of the first network device is equal to the priority of the neighbor network device, according to a size relation between a media access control (MAC) address of the first network device and a MAC address of the neighbor network device, the role of the first network device is determined as the authentication access controller or the request device.

It should be noted that the network device in embodiments of the present disclosure may be a device with changeable access roles, and the role of the device is not limited to a switch or other devices.

Based on the above introduction, the network device role self-adaptive method provided by embodiments of the present disclosure will be described below with reference to the accompanying drawings.

Figure 1:
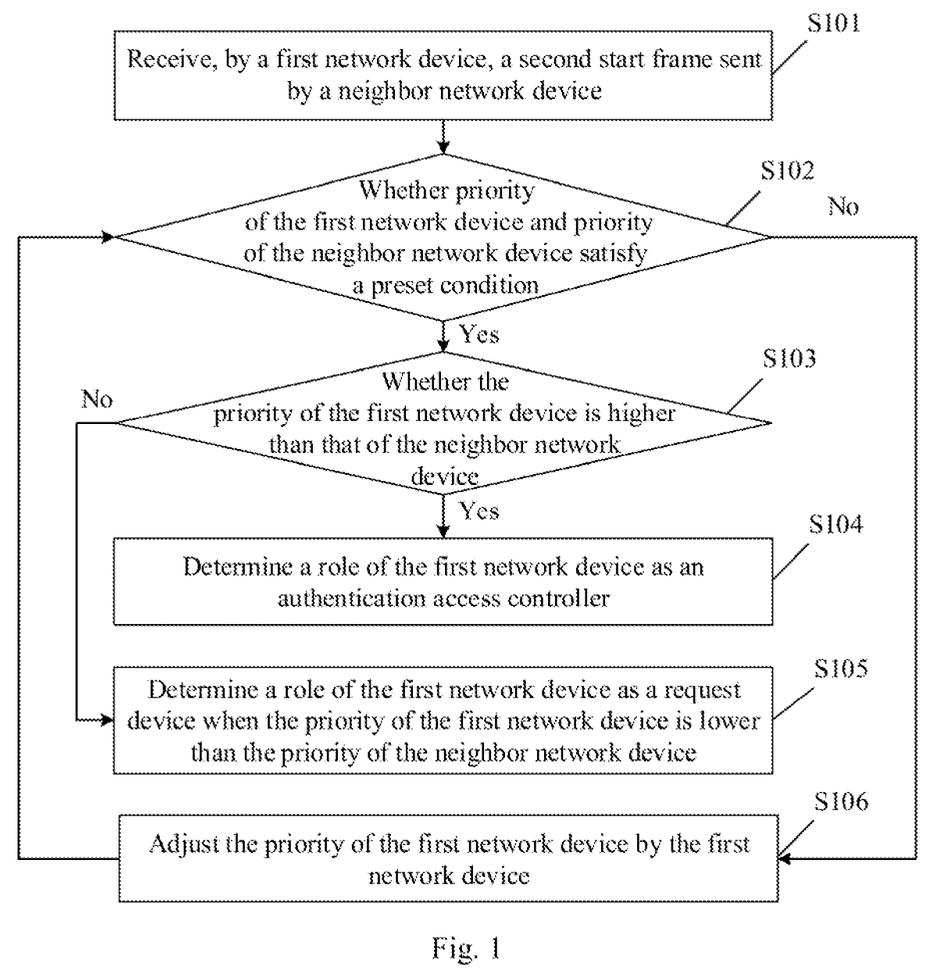
FIG. 1 is a flowchart of a network device role self-adaptive method provided by an embodiment of the present disclosure.

With reference to FIG. 1, a flowchart of a network device role self-adaptive method provided by an embodiment of the present disclosure is shown. The method is applied to a network device, and may include followings.

S101: a first network device receives a second start frame sent by a neighbor network device.

In this embodiment, the first network device may receive the second start frame sent by the neighbor network device in real time, where the second start frame includes information on priority of the neighbor network device, and the priority of the neighbor network device is determined by the neighbor network device according to information including a result of connection between the neighbor network device and a server.

A specific implementation process of determining the priority of the neighbor network device by the neighbor network device according to the information including the result of connection between the neighbor network device and the server will be described in the following embodiments. The server may be the AS or other types of servers, which are not limited in this embodiment.

S102: the first network device determines whether the priority of the first network device and the priority of the neighbor network device satisfy the preset condition, and if so, proceed to S103; otherwise, proceed to S106.

After receiving the second start frame, the first network device acquires the priority of the neighbor network device from the second start frame, and determines whether the priority of the first network device and the priority of the neighbor network device satisfy the preset condition, if so, proceed to S103. The preset condition includes the priority of the first network device being the non-initial level and the priority of the neighbor network device being the non-initial level. That is, when the first network device determines that the priority of the first network device and the priority of the neighboring network are both the non-initial levels, it means that the priority of the first network device and the priority of the neighboring network device satisfy the preset condition, and proceed to S103. If the first network device determines that the priority of the first network device and/or the priority of neighbor network device is the initial level, it means that the priority of the first network device and the priority of the neighboring network device do not satisfy the preset condition, and proceed to S106 to adjust the priority until the priority of the first network device and the priority of neighbor network device satisfy the preset condition. A specific implementation process of adjusting the priority of the first network device by the first network device will be described in the following embodiments.

For example, for the first network device, a priority field of the first network device may be expressed as loc_priority, a priority field of the neighbor network device may be expressed as opp_priority, and the initial level may be expressed as 0. Therefore, if loc_priority!=0&&opp_priority!=0, the preset condition is satisfied, and a subsequent role is determined. If loc_priority==0||opp_priority==0, and the preset condition is not satisfied, the priority may be adjusted. The symbol "&&" indicates logical AND, the symbol "||" indicates logical OR, and the symbol "!=" means not equal, and the symbol "==" means equal.

The priority of the first network device is determined by the first network device according to the information including the result of connection between the first network device and the server, and implementation of determining of the priority of the first network device by the first network device will be described in the following embodiments.

S103: The first network device determines whether the priority of the first network device is higher than that of the neighbor network device, if so, proceed to S104; otherwise proceed to S105.

S104: The first network device determines the role thereof as the authentication access controller when the priority of the first network device is higher than that of the neighbor network device.

S105: When the priority of the first network device is lower than that of the neighbor network device, the first network device determines the role thereof as the request device.

In this embodiment, on the premise that the priority of the first network device and the priority of the neighbor network device satisfy the preset condition, when the first network device determines that the priority of the first network device is higher than that of the neighbor network device, the first network device determines the role of the first network device as the authentication access controller, such that the neighbor network device is the request device. When the first network device determines that the priority of the first network device is lower than that of the neighbor network device, the first network device determines the role of the first network device as the request device, such that the neighbor network device is the authentication access controller. For example, for the first network device, when loc_priority>opp_priority, the first network device determines the role of the first network device as AAC. When loc_priority<opp_priority, the first network device determines the role of the first network device as the REQ.

S106: the first network device adjusts the priority thereof.

That is, when the priority of the first network device and/or the priority of the neighbor network device does not satisfy the preset condition, the first network device re-adjusts the priority thereof. Optionally, the first network device sets the priority thereof as the initial level and sends a first start frame to the neighbor network device, and the first start frame includes information on the priority of the first network device being the initial level. After sending the first start frame, the first network device adjusts the priority thereof to indicate sending of the first start frame. Then the first network device sends a first discovery message to the server, so as to determine the priority of the first network device according to the information including the result of connection between the first network device and the server. A specific implementation process of determining the priority of the first network device by the first network device will be described in the following embodiments.

It should be noted that when the priority of the first network device and/or the priority of the neighbor network device does not satisfy the preset condition, the first network device sends the first start frame including the priority of the first network device being the initial level to the neighbor network device, to inform the neighbor network device that the first network device is in the initial level by means of the first start frame, further the neighbor network device sets the priority of the neighbor network device to the initial level when in the non-initial level, and therefore the first network device and the neighbor network device are in a peer-to-peer state and are reconnected with the server, to set the priority thereof.

It may be understood that in a practical application, when the priority of the first network device and the priority of the neighbor network device satisfy the preset condition and are equal, a role may not be determined according to a priority level relation. Based on this, the embodiment of the present disclosure provides an implementation. Since the MAC address of each network device is unique, the role may be determined according to a size of the MAC address corresponding to the network device. Optionally, the first network device determines the role thereof as the authentication access controller or the request device according to the size relation between the MAC address of the first network device and the MAC address of the neighbor network device.

The first network device may be pre-configured according to a rule for determining the role based on the MAC address. For example, when the MAC address of the first network device is larger than that of the neighbor network device, the first network device determines the role thereof as the authentication access controller, and when the MAC address of the first network device is smaller than that of the neighbor network device, the first network device determines the role thereof as the request device. For another example, when the MAC address of the first network device is larger than that of the neighbor network device, the first network device determines the role thereof as the request device, and when the MAC address of the first network device is smaller than that of the neighbor network device, the first network device determines the role thereof as the authentication access controller.

When the first network device determines the role thereof according to the MAC address thereof and the MAC address of the neighbor network device, the first network device acquires the MAC addresses of the neighbor network device in advance. For example, the first network device acquires the MAC address of the neighbor network device when discovering the neighbor network device. A specific implementation process of discovering the neighbor network device by the first network device will be described in the following embodiments.

It should be noted that, in the present disclosure, if the network device receives the response message sent by the server, that is, when the network device is connected with the server, the network device may act as an authentication access controller theoretically, and may set the priority thereof to highest priority. The so-called priority refers to capacity of the network device to become the role of the authentication access controller, and the higher the capacity of the network device to become the role of the authentication access controller is, the higher the priority of the network device is.

Optionally, if only one of the two network devices is connected with the server, the network device may set the priority thereof to the highest priority, so as to indicate that a role thereof is the authentication access controller, while a role of the other network device that is not connected with the server is the request device. If both network devices are connected with the server, the two network devices may set the priority thereof to highest priority, in this case, the two network devices may determine respective roles thereof, that is the authentication access controllers or the request device, according to other strategies, for example, by comparing the size of respective MAC addresses thereof.

Based on the above description, it may be known that each of the first network device and the neighbor network device determines the priority thereof according to the information including the result of connection between same and the server, the first network device receives the second start frame sent by the neighbor network device, and the second start frame includes the information on the priority of the neighbor network device. The first network device determines whether the priority of the first network device and the priority of the neighbor network device satisfy the preset condition, that is, whether the priority of the first network device and the priority of the neighbor network device are non-initial levels. The first network device determines the role of the first network device as the authentication access controller when the preset condition is satisfied and the priority of the first network device is higher than that of the neighbor network device. The first network device determines the role of the first network device as the request device when the preset condition is satisfied and the priority of the first network device is lower than that of the neighbor network device. In this way, according to the method provided by the embodiment of the present disclosure, each of the first network device and the neighbor network device may flexibly determine the priority thereof according to the result of connection between the first network device/the neighbor network device and the server, to further determine the role thereof.

It may be known from the embodiment above that each of the first network device and the neighbor network device determines the priority thereof according to the information including the result of connection between same and the server, and the process of determining the priority of the first network device by the first network device and the process of determining the priority of the neighbor network device by the neighbor network device will be described below.

I. The process of determining the priority of the first network device includes follows.

1) The first network device sends the first discovery message to the server.

2) The first discovery message is repeatedly sent to the server when a first response message sent by the server is not received within preset time.

The first network device sends the first discovery message to the server to be connected with the server and achieve information transmission. If the first network device does not receive, within the preset time, the first response message sent by the server, the first network device continues to send the first discovery message to the server until the first network device receives, within the preset time, the first response message sent by the server. The preset time may be set according to actual requirements. After the first network device sends the first discovery message to the server, a timer may be started to start counting. If the first response message sent by the server is not received within the preset time, the timer is reset and the first discovery message is re-sent to the server.

Optionally, before sending the first discovery message to the server, the first network device needs to set the priority thereof to the initial level, and send the first start frame including the information on the priority of the first network device being the initial level to the neighbor network device, such that the neighbor network device may know that the first network device is in an initial state. After the first network device sends the first start frame, in order to record that the first start frame is sent, the first network device needs to adjust the priority thereof, specifically, from the initial level to a non-initial level except the highest priority and the lowest priority, and then send the first discovery message to the server.

It may be seen from the description above that if the first network device does not receive, by the end of the preset time, the first response message sent by the server, the priority of the first network device is the non-initial level except the highest priority and the lowest priority. If the first network device does not receive, by the end of the preset time, the first response message sent by the server, the first network device needs to get reconnected to the server, such that the priority thereof will be set to the initial level.

It should be noted that in this embodiment, the initial level may be set to any value, and a value of the highest priority may be smaller than the value of the initial level or larger than the value of the initial level.

It may be understood that before the first network device sends the first start frame to the neighbor network device, the first network device needs to discover the neighbor network device, and then sends the first start frame to the neighbor network device after discovers and gets connected with the neighbor network device. The process of discovering the neighbor network device by the first network device includes: the first network device broadcasts a neighbor data packet including the MAC address and a device type of the first network device; and after receiving the neighbor data packet, the neighbor network device sends an acknowledgment message to the first network device, and the first network device receives the acknowledgment message including the MAC address and a device type of the neighbor network device.

That is, the first network device sends the neighbor data packet by broadcasting, and the network device that receives the neighbor data packet, that is, the neighbor network device, sends the acknowledgment message to the first network device, such that the first network device determines the network device that sends the acknowledgment message as the neighbor network device, thus completing discovery of the neighbor network device.

It should be noted that after the first network device discovers the neighbor network device, the first network device may establish a session with the neighbor network device, so as to send the first start frame to the neighbor network device during session lifetime.

3) The first network device sets the priority of the first network device to the highest priority when the first network device receives, within preset time, the first response message sent by the server.

When the first network device may receive, within the preset time, the first response message sent by the server, it indicates that the first network device may be connected with the server, then the priority of the first network device is set to the highest priority. For example, the priority field loc_priority=0xff of the first network device indicates the highest level.

In addition, in the practical application, a port of each network device may be in a link aggregation state, and when the port of the network device is in the link aggregation state, the priority of the network device is related to a role of the link aggregation ports. Therefore, when the first network device receives, within the preset time, the first response message sent by the server and the first network device is provided with the link aggregation ports, the process of determining the priority of the first network device includes: the first network device acquires role information of the link aggregation ports. When the role information of the link aggregation ports is the authentication access controller, the first network device sets the priority thereof to the highest priority. That is, the first network device determines the priority thereof according to the role information of the link aggregation ports. Optionally, when the role of the link aggregation ports of the first network device is the authentication access controller, the first network device sets the priority thereof to the highest priority, for example, loc_priority=0xff. It should be noted that when the role information of the link aggregation ports of the first network device is not determined, determination of the priority of the first network device is not affected by the role of the link aggregation ports.

The link aggregation ports refer to a logical port formed by aggregation of a plurality of physical ports, so as to achieve load sharing of outgoing/incoming traffic throughput among the member ports. The network device decides a member port from which a network packet is sent to an opposite-end network device according to a port load sharing policy configured by a user.

Optionally, the step that the first network device acquires role information of the link aggregation ports includes: a link aggregation group to which the link aggregation ports belong is determined; and role information of link aggregation ports in an access state is acquired from the link aggregation group. It should be noted that each network device may include multiple ports, and different ports may be provided with different functions. Therefore, ports with the same functions may be combined to form the link aggregation group, such that roles of the link aggregation ports included in the link aggregation group are identical. Based on this, when it is determined that the first network device is provided with the link aggregation ports, the link aggregation group to which the link aggregation ports belong is first determined, and the role information of the link aggregation ports in the access state, in the link aggregation group is determined as the role information of the link aggregation ports corresponding to the first network device.

It should be noted that after the first network device sets the priority thereof to the highest priority, the first network device needs to send a first start frame including information on the priority of the first network device being the highest priority to the neighbor network device, such that the neighbor network device may know that the first network device is in the highest priority state, and send a second start frame including information on current priority of the neighbor network device to the first network device.

II. The process of determining the priority of the neighbor network device includes followings.

1) The neighbor network device receives the first start frame which includes the information on the priority of the first network device being the initial level and is sent by the first network device, and sets the priority of the neighbor network device to the initial level according to the first start frame when the priority of the neighbor network device is the non-initial level.

2) The neighbor network device sends a second discovery message to the server.

Before sending the second discovery message to the server, the neighbor network device needs to guarantee that a state thereof is consistent with that of the first network device. Since the first start frame received by the neighbor network device includes the information on the priority of the first network device being the initial level, when the priority of the neighbor network device is the non-initial level, the neighbor network device needs to set the priority thereof to the initial level according to the first start frame, such that both the neighbor network device and the first network device are in the initial state, and then the neighbor network device sends the second discovery message to the server, and adjusts the priority thereof from the initial level to the non-initial level except the highest priority and the lowest priority.

3) The second discovery message is repeatedly sent to the server when the neighbor network device does not receive, within preset time, a second response message sent by the server.

Before repeatedly sending the second discovery message to the server, the neighbor network device adjusts the priority thereof to the initial level, and sends a second start frame including information on the priority of the neighbor network device being the initial level to the first network device, such that the first network device knows that the neighbor network device is in the initial state. After sending the second start frame, the neighbor network device adjusts the priority thereof to record sending of the second start frame. After sending the second start frame, the neighbor network device may adjust the priority thereof from the initial level to the non-initial level except the highest priority and the lowest priority.

It may be seen from the description above that if the neighbor network device does not receive, by the end of the preset time, the second response message sent by the server, the priority of the neighbor network device is the non-initial level except the highest priority and the lowest priority. If the neighbor network device does not receive, by the end of the preset time, the second response message sent by the server, the neighbor network device needs to get reconnected to the server, so the priority thereof will be set to the initial level.

4) The neighbor network device sets the priority thereof to the highest priority when the neighbor network device receives, within the preset time, the second response message sent by the server.

When setting the priority thereof to the highest priority, the neighbor network device sends the second start frame to the first network device, and the second start frame includes information on the priority of the neighbor network device being the highest priority.

It should be noted that the process of determining the priority of the neighbor network device in this embodiment is similar to the process of determining the priority of the first network, the above embodiment may be referred to for specific implementation which will not be repeated herein.

In some embodiments, when the neighbor network device receives, within the preset time, the second response message sent by the server and the neighbor network device is provided with the link aggregation ports, the process of determining the priority of the neighbor network device includes: the neighbor network device acquires role information of the link aggregation ports. When the role information of the link aggregation ports is the authentication access controller, the neighbor network device sets the priority thereof to the highest priority. It should be noted that when the role information of the link aggregation ports of the neighbor network device is not determined, determination of the priority of the neighbor network device is not affected by the role of the link aggregation ports.

The acquiring role information of the link aggregation ports by the neighbor network device includes: a link aggregation group to which the link aggregation ports belong is determined; and role information of link aggregation ports in an access state is acquired from the link aggregation group. Implementation of acquiring of the role information of the link aggregation ports by the first network device in the above embodiment may be referred to for the process of acquiring the role information of the link aggregation ports by the neighbor network device, which will not be repeated in this embodiment herein.

When the priority of the neighbor network device is determined, the second start frame including the priority of the neighbor network device is sent to the first network device, such that the first network device may acquire the information on the priority of the neighbor network device.

It should be noted that when the neighbor network device receives the first start frame including the priority of the first network device being the highest priority, the neighbor network device needs to send the second start frame including the information on the current priority of the neighbor network device to the first network device.

To facilitate understanding of the technical solution provided by embodiments of the present disclosure, a role self-adaptive process will be described below by taking the first network device as a first switch, the neighbor network device as a neighbor switch, and the server as the authentication server as examples.

Figure 2:
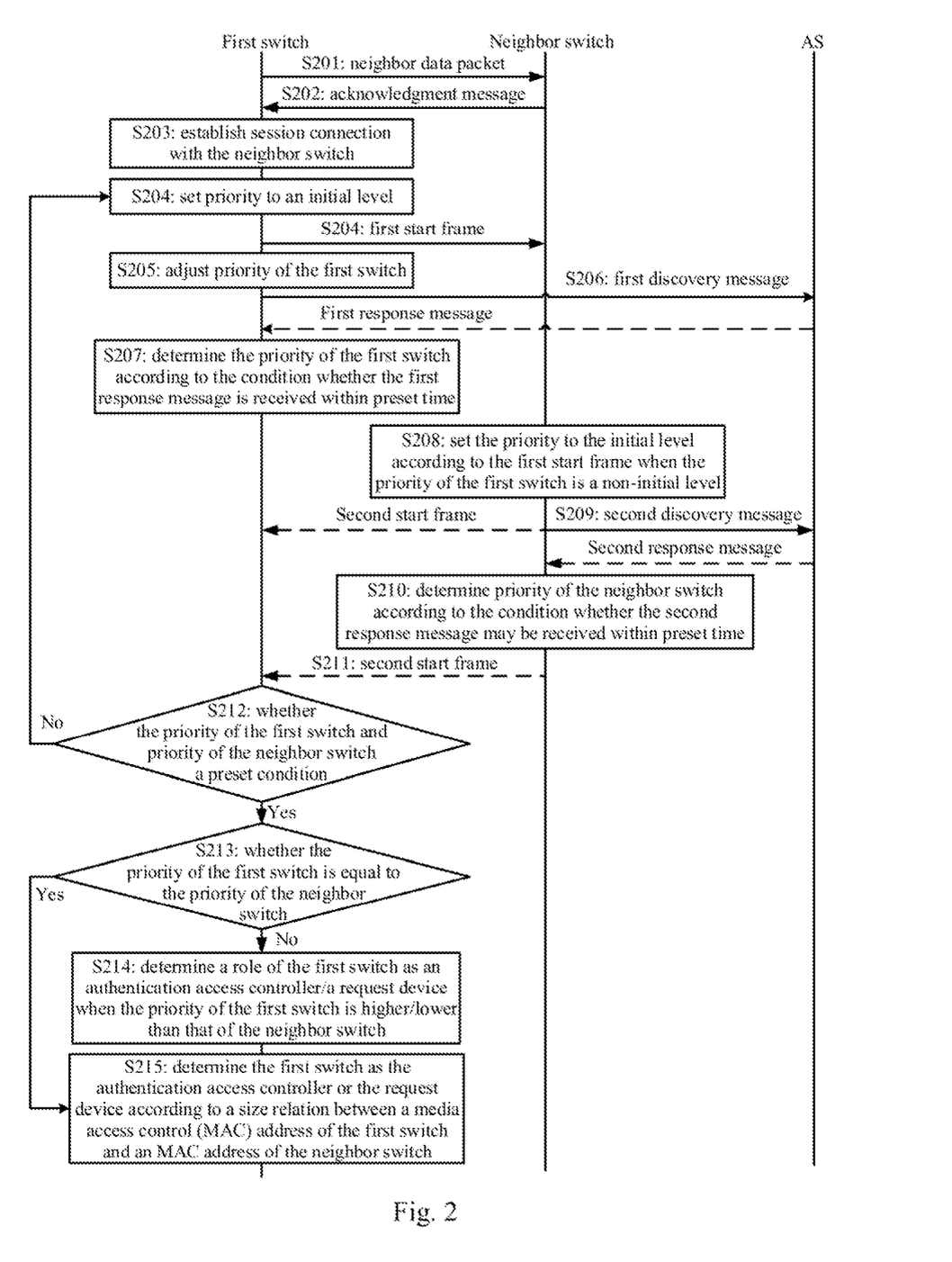
FIG. 2 is an application scene signaling interaction diagram provided by an embodiment of the present disclosure.

With reference to FIG. 2, a schematic diagram of an application scene provided by an embodiment of the present disclosure is shown. An implementation process of the scene includes followings.

S201: The first switch broadcasts a neighbor data packet.

The neighbor data packet includes a MAC address and a device type of the first switch, and the device type is used to indicate that a device is a switch.

S202: The first switch receives an acknowledgment message sent by the neighbor switch.

The acknowledgment message is sent to the first switch by the neighbor switch after receiving the neighbor data packet. The acknowledgment message includes a MAC address and a device type of the neighbor switch.

S203: The first switch establishes a session connection with the neighbor switch according to the acknowledgment message.

S204: The first switch sets priority thereof to an initial level, and sends a first start frame to the neighbor switch through session connection, where the first start frame includes information on the priority of the first switch being the initial level.

S205: The first switch adjusts the priority thereof to indicate that the first switch sends the first start frame to the neighbor switch.

The first switch adjusts the priority thereof from the initial level to a non-initial level except highest priority and lowest priority.

S206: The first switch sends a first discovery message to the authentication server.

S207: The first switch determines the priority thereof according to the condition whether the first switch may receive, within preset time, a first response message sent by the authentication server.

In this embodiment, the first switch sends the first discovery message to the authentication server to discover the authentication server and get connected with same. After receiving the first discovery message, the authentication server sends the first response message to the first switch. If the first switch may receive the first response message within the preset time, the first switch sets the priority thereof to the highest priority. If the first switch does not receive the first response message within the preset time, the first switch re-executes S204-S207.

It should be noted that when there are link aggregation ports between the first switch and the neighbor switch, the first switch determines the priority thereof according to role information of link aggregation ports. Specifically, when the link aggregation ports are the authentication access controller, the first switch sets the priority thereof to the highest priority. When the role information of the link aggregation ports of the first switch is not determined, determination of the priority of the first switch is not affected by the role of the link aggregation ports.

S208: The neighbor switch receives the first start frame including the information on the priority of the first switch being the initial level, and sets the priority thereof to the initial level when the priority thereof is the non-initial level.

It should be noted that S208 and S205-S207 are not in a particular order when executed, that is, after the first switch sends the first start frame to the neighbor switch in S204, the neighbor switch may start to execute S208 and subsequent S209-S210 when receiving the first start frame.

S209: The neighbor switch sends a second discovery message to the authentication server.

After sending the second discovery message, the neighbor switch adjusts the priority thereof from the initial level to the non-initial level except the highest priority and the lowest priority.

S210: The neighbor switch determines the priority thereof according to the condition whether the neighbor switch may receive, within preset time, a second response message sent by the authentication server.

In this embodiment, the neighbor switch sends the second discovery message to the authentication server to discover the authentication server and get connected with same. After receiving the second discovery message, the authentication server sends the second response message to the neighbor switch.

If the neighbor switch may receive, within the preset time, the second response message, the neighbor switch sets the priority thereof to the highest priority, and sends a second start frame including the priority of the neighbor switch being the highest priority to the first switch.

If the neighbor switch does not receive, within the preset time, the second response message, the neighbor switch re-executes S209 and S210. Before the neighbor switch re-sends the second discovery message to the authentication server, the neighbor switch needs to send the second start frame including the priority of the neighbor switch being the initial level to the first switch, such that the first switch may know that the neighbor switch is in an initial level state, and adjust the priority thereof to the initial level accordingly, and the first switch and the neighbor switch are in a peer-to-peer state and re-determine respective priority thereof. The neighbor switch may adjust the priority thereof to a non-initial level except the highest priority and the lowest priority after sending the second start frame including the priority of the neighbor switch being the initial level, so as to record sending, by the neighbor switch, of the second start frame including the priority of the neighbor switch being the initial level to the first switch.

It should be noted that after the first switch sets the priority thereof to the highest priority, the first switch needs to send a first start frame including information on the priority of the first switch being the highest priority to the neighbor switch, to inform the neighbor switch about a state that the first switch is in the highest priority, and needs to send a second start frame including information on current priority of the neighbor switch to the first switch. The information on current priority of the neighbor switch includes the initial level, the non-initial level except the highest priority and the lowest priority or the highest priority.

When the priority of the neighbor switch is the non-initial level except the highest priority and the lowest priority, it indicates that the neighbor switch is not connected with the server by the end of the preset time. When the priority of the neighbor switch is the highest priority, it indicates that the neighbor switch is connected with the server by the end of the preset time. When the priority of the neighbor switch is the initial level, it indicates that the neighbor switch is not connected to the server by the end of the preset time, and tries to get reconnected with the server.

It should be noted that when there are link aggregation ports between the neighbor switch and the first switch, the neighbor switch determines the priority thereof according to role information of link aggregation ports. Specifically, when the link aggregation ports are the authentication access controller, the neighbor switch sets the priority thereof to the highest priority. When the role information of the link aggregation ports of the neighbor switch is not determined, the priority of the neighbor switch is not affected by the role of the link aggregation ports.

S211: The first switch receives the second start frame sent by the neighbor switch, and the second start frame includes information on the priority of the neighbor switch.

When the first switch receives the second start frame sent by the neighbor switch, the information on the priority of the first switch includes the non-initial level except the highest priority and the lowest priority, the highest priority or the initial level. When the priority of the first switch is the non-initial level except the highest priority and the lowest priority, it indicates that the first switch is not connected with the server by the end of the preset time. When the priority of the first switch is the highest priority, it indicates that the first switch is connected with the server by the end of the preset time. When the priority of the first switch is the initial level, it indicates that the first switch is not connected to the server by the end of the preset time, and tries to get reconnected with the server.

S212: The first switch determines whether the priority thereof and the priority of the neighbor switch satisfy a preset condition, if so, S213 is executed; otherwise, S204 and subsequent steps are repeatedly executed.

S213: The first switch determines whether the priority thereof is equal to that of the neighbor switch, if so, S215 is executed; and otherwise, S214 is executed.

S214: When the priority of the first switch is lower than that of the neighbor switch, the first switch determines a role thereof as the request device; and when the priority of the first switch is higher than that of the neighbor switch, the first switch determines a role thereof as the authentication access controller.

S215: The first switch determines the role thereof as the authentication access controller or the request device according to a size relation between a MAC address of the first switch and a MAC address of the neighbor switch.

Based on the embodiment of the method above, some embodiments of the present disclosure also provides a corresponding apparatus for implementing the method, which will be described below with reference to the accompanying drawings.

Figure 3:
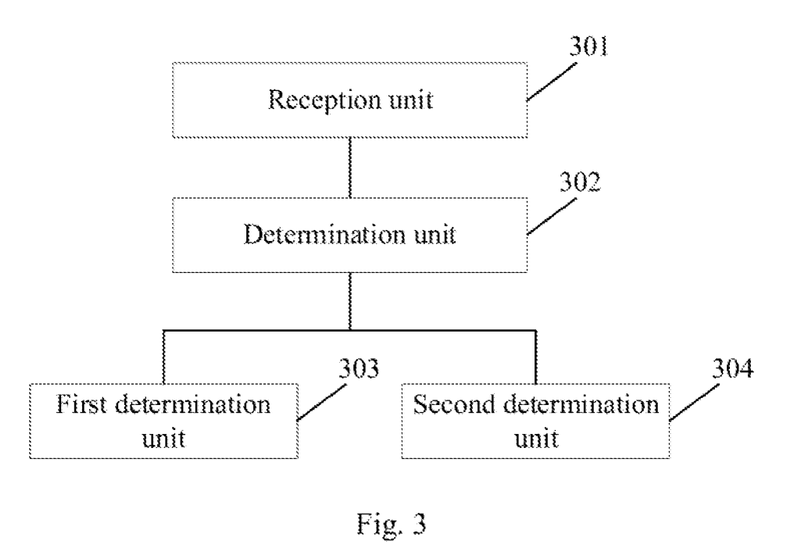
FIG. 3 is a structural diagram of a network device role self-adaptive apparatus provided by an embodiment of the present disclosure.

With reference to FIG. 3, a structural diagram of a network device role self-adaptive apparatus of the present disclosure is shown. The apparatus is applied to a first network device, and the apparatus includes:

a reception unit 301 configured to receive, by a first network device, a second start frame sent by a neighbor network device, where the second start frame includes priority of the neighbor network device, and the priority of the neighbor network device is determined by the neighbor network device according to information including a result of connection between the neighbor network device and a server;

a determination unit 302 configured to determine whether priority of the first network device and the priority of the neighbor network devices satisfy a preset condition, where the priority of the first network device is determined by the first network device according to information including a result of connection between the first network device and the server, and the preset condition includes the priority of the first network device being a non-initial level and the priority of the neighbor network device being a non-initial level;

a first determination unit 303 configured to determine a role of the first network device as a request device when the preset condition is satisfied and the priority of the first network device is lower than that of the neighbor network device; and a second determination unit 304 configured to determine a role of the first network device as an authentication access controller when the preset condition is satisfied and the priority of the first network device is higher than that of the neighbor network device.

In some embodiments, the apparatus further includes a sending unit and a setting unit, and a process of determining the priority of the first network device includes:

a first discovery message is sent to the server by the sending unit; and the first discovery message is repeatedly sent to the server when a first response message sent by the server is not received within preset time; alternatively, the priority of the first network device is set to highest priority by the setting unit when a first response message sent by the server is received within preset time.

In some embodiments, before the first discovery message is sent to the server by the sending unit, the setting unit sets the priority of the first network device to an initial level, and the sending unit sends a first start frame to the neighbor network device, the first start frame including information on the priority of the first network device being the initial level; and the setting unit adjusts the priority of the first network device after the sending unit sends the first start frame, and then the sending unit sends the first discovery message to the server.

In some embodiments, before the sending unit sends the first start frame to the neighbor network device, the apparatus further includes:

a broadcasting unit configured to broadcast a neighbor data packet, where the neighbor data packet includes a MAC address and a device type of the first network device; and the reception unit receives an acknowledgment message sent after the neighbor network device receives the neighbor data packet, where the acknowledgment message includes a MAC address and a device type of the neighbor network device.

In some embodiments, when the first network device receives, within the preset time, the first response message sent by the server and the first network device has link aggregation ports, the apparatus further includes an acquisition unit, and the process of determining the priority of the first network device includes:

the acquisition unit acquires role information of the link aggregation ports; and the priority of the first network device is set to the highest priority by the setting unit when the role information of the link aggregation ports is an authentication access controller.

In some embodiments, the step that the acquisition unit acquires role information of the link aggregation ports includes:

a link aggregation group to which the link aggregation ports belong is determined; and role information of link aggregation ports in an access state is acquired from the link aggregation group.

In some embodiments, after the priority of the first network device is set to the highest priority by the setting unit, the sending unit sends a first start frame including the priority of the first network device being the highest priority to the neighbor network device.

In some embodiments, when the preset condition is satisfied and the priority of the first network device is equal to the priority of the neighbor network device, the apparatus further includes:

a third determination unit configured to determine the role of the first network device as the authentication access controller or the request device according to a size relation between the MAC address of the first network device and the MAC address of the neighbor network device.

In some embodiments, when the preset condition is not met, the setting unit sets the priority of the first network device to the initial level, and the sending unit sends the first start frame to the neighbor network device; and the setting unit adjusts the priority of the first network device after the sending unit sends the first start frame, and then the sending unit sends the first discovery message to the server, such that the first network device determines the priority of the first network device according to the information including the result of connection between the first network device and the server.

In some embodiments, the first network device includes a first switch, and the neighbor network device includes a neighbor switch.

It should be noted that implementation of each unit in this embodiment may refer to the above method embodiment, and will not be described in detail in this embodiment herein.

Moreover, the present disclosure further provides a network device role self-adaptive apparatus, where the apparatus is applied to a neighbor network device, and the apparatus includes:

a sending unit configured to send a second start frame to a first network device; the second start frame includes priority of the neighbor network device, the priority of the neighbor network device being determined by the neighbor network device according to information including a result of connection between the neighbor network device and a server; the second start frame is used by the first network device to determine whether priority of the first network device and the priority of the neighbor network device satisfy a preset condition, the preset condition including the priority of the first network device being a non-initial level and the priority of the neighbor network device being a non-initial level.

In some embodiments, the apparatus further includes a reception unit and a setting unit, and a process of determining the priority of the neighbor network device includes:

the reception unit receives a first start frame sent by the first network device, where the first start frame includes information on the priority of the first network device being an initial level;

the setting unit sets the priority of the neighbor network device to an initial level on the condition that the priority of the neighbor network device is the non-initial level after the reception unit receives the first start frame;

the sending unit sends a second discovery message to the server; and the second discovery message is repeatedly sent to the server when a second response message sent by the server is not received within preset time; alternatively, the setting unit sets the priority of the neighbor network device to highest priority when a second response message sent by the server is received within preset time.

In some embodiments, before the second discovery message is repeatedly sent to the server, the sending unit sends the second start frame to the first network device, the second start frame including information on the priority of the neighbor network device being the initial level; and the setting unit adjusts the priority of the neighbor network device after the sending unit sends the second start frame, and then the sending unit sends the second discovery message to the server.

In some embodiments, when the neighbor network device receives, within the preset time, the second response message sent by the server and the neighbor network device has link aggregation ports, the apparatus further includes an acquisition unit, and the process of determining the priority of the neighbor network device includes:

the acquisition unit acquires role information of the link aggregation ports; and the setting unit sets the priority of the neighbor network device to the highest priority when the role information of the link aggregation ports is an authentication access controller.

In some embodiments, the step that the acquisition unit acquires role information of the link aggregation ports includes:

a link aggregation group to which the link aggregation ports belong is determined; and role information of link aggregation ports in an access state is acquired from the link aggregation group.

In some embodiments, after the priority of the neighbor network device is determined, the sending unit sends the second start frame including the priority of the neighbor network device to the first network device.

In some embodiments, after the reception unit receives a first start frame, including the priority of the first network device being highest priority, sent by the first network device, the sending unit sends the second start frame including the priority of the neighbor network device to the first network device.

In some embodiments, the reception unit is further configured to receive a neighbor data packet broadcast by the first network device, where the neighbor data packet includes a MAC address and a device type of the first network device; and the sending unit is further configured to send an acknowledgment message to the first network device after the reception unit receives the neighbor data packet, where the acknowledgment message includes a MAC address and a device type of the neighbor network device.

It should be noted that implementation of each unit in this embodiment may refer to the above method embodiment, and will not be described in detail in this embodiment herein.

Moreover, some embodiments of the present disclosure further provide a network device. The network device includes: a processor and a memory; where the memory is configured to store an instruction or a computer program; and the processor is configured to execute the instruction or the computer program and execute the role self-adaptive method above.

An embodiment of the present disclosure provides a computer readable storage medium. The medium includes an instruction or a computer and when run on a computer, the instruction or the computer program causes the computer to execute the network device role self-adaptive method above.

Based on the above description, it may be known that each of the first network device and the neighbor network device determines the priority thereof according to the information including the result of connection between same and the server, the first network device receives the second start frame sent by the neighbor network device, and the second start frame includes the information on the priority of the neighbor network device. The first network device determines whether the priority thereof and the priority of the neighbor network device satisfy the preset condition, that is, whether the priority of the first network device and the priority of neighbor network device are both the non-initial levels. The first network device determines the role of the first network device as the authentication access controller when the preset condition is satisfied and the priority of the first network device is higher than that of the neighbor network device. The first network device determines the role of the first network device as the request device when the preset condition is satisfied and the priority of the first network device is lower than that of the neighbor network device. In this way, according to the method provided by the embodiment of the present disclosure, each of the first network device and the neighbor network device may flexibly determine the priority thereof according to the result of connection between the first network device/the neighbor network device and the server, further to determine the role thereof.

It should be noted that each embodiment in the specification is described in a progressive manner, each embodiment focuses on differences with another embodiment, and the embodiments may refer to one another for the same and similar portions. For the system or the apparatus disclosed in the embodiments, since the system corresponds to the method disclosed in the embodiments, and description is relatively simple, reference can be made to description of the method for relevant contents.

It should be understood that in the present disclosure, "at least one (item)" means one or more, and "plurality" means two or more. "and/or" describes an association relationship between associated objects, indicates that there may be three relationships, for example, A and/or B may indicate three conditions that A exists alone, B exists alone, and A and B exist simultaneously, where A and B may be singular or plural. The character "/" generally indicates that the front and back associated objects is of an "or" relationship. "At least one of the following items" or its similar expression refers to any combination of these items, including any combination of single items or plural items. For example, at least one of a, b or c may mean: a, b, c, "a and b", "a and c", "b and c" or "a and b and c", where a, b and c may be single or multiple.

It should be further noted that in the specification, relational terms such as first and second are merely used to distinguish one entity or one operation from another entity or another operation, and do not necessarily require or imply any such actual relationship or order among these entities or operations. In addition, the terms "comprising", "including" or any other variant thereof are intended to cover non-exclusive inclusion, such that a process, a method, an article or a device including a series of elements not only include those elements, but include other elements not listed clearly, or further include elements inherent to such process, method, article or apparatus. In the case of no more limitations, the element limited by the sentence "including a . . . " does not exclude that there exists another same element in the process, method, article or device including the element.

The steps of the method or an algorithm described in conjunction with the embodiments disclosed herein may be directly implemented with hardware, a software module executed by a processor, or a combination of the hardware and the software module. The software module may be placed in a random access memory (RAM), a memory, a read only memory (ROM), an electrically programmable ROM, an electrically erasable programmable ROM, a register, a hard disk, a removable disk, a compact disc read-only memory (CD-ROM), or a storage medium in any other form known in the technical field.

What is claimed is:

1. A network device role self-adaptive method, comprising:

receiving, by a first network device, a second start frame sent by a neighbor network device, where the second start frame comprises a priority of the neighbor network device, and the priority of the neighbor network device is determined by the neighbor network device according to information comprising a result of connection between the neighbor network device and a server;

determining, by the first network device, whether a priority of the first network device and the priority of the neighbor network devices satisfy a preset condition, wherein the priority of the first network device is determined by the first network device according to information comprising a result of connection between the first network device and the server, and the preset condition comprises the priority of the first network device being a non-initial level and the priority of the neighbor network device being a non-initial level; and determining, by the first network device, a role of the first network device as an authentication access controller in response to the preset condition being satisfied and the priority of the first network device being higher than the priority of the neighbor network device;

determining, by the first network device, a role of the first network device as a request device in response to the preset condition being satisfied and the priority of the first network device being lower than the priority of the neighbor network device;

wherein the determining the priority of the first network device comprises:

sending a first discovery message to the server by the first network device;

repeatedly sending the first discovery message to the server in response to the first network device not receiving, within a preset time, a first response message sent by the server;

setting the priority of the first network device to highest priority by the first network device in response to the first network device receiving, within the preset time, the first response message sent by the server.

2. The method according to claim 1, wherein before the sending a first discovery message to the server by the first network device, the method further comprises:

setting, by the first network device, the priority of the first network device to an initial level, and sending a first start frame to the neighbor network device, wherein the first start frame comprises information on the priority of the first network device being the initial level; and adjusting the priority of the first network device, and sending the first discovery message to the server by the first network device.

3. The method according to claim 2, wherein before the sending a first start frame to the neighbor network device by the first network device, the method further comprises:

broadcasting a neighbor data packet by the first network device, wherein the neighbor data packet comprises a media access control, MAC, address and a device type of the first network device; and receiving, by the first network device, an acknowledgment message sent after the neighbor network device receives the neighbor data packet, wherein the acknowledgment message comprises a MAC address and a device type of the neighbor network device.

4. The method according to claim 2, wherein the determining the priority of the neighbor network device comprises:

receiving, by the neighbor network device, the first start frame sent by the first network device, and setting the priority of the neighbor network device to an initial level according to the first start frame in response to the priority of the neighbor network device being the non-initial level;

sending a second discovery message to the server by the neighbor network device; and repeatedly sending the second discovery message to the server in response to the neighbor network device not receiving, within a preset time, a second response message sent by the server, setting the priority of the neighbor network device to highest priority by the neighbor network device in response to the neighbor network device receiving, within the preset time, a second response message sent by the server.

5. The method according to claim 4, wherein before repeatedly sending the second discovery message to the server by the neighbor network device, sending, by the neighbor network device, the second start frame to the first network device, the second start frame comprising information on the priority of the neighbor network device being the initial level;

adjusts the priority of the neighbor network device by the neighbor network device, and sends the second discovery message to the server.

6. The method according to claim 4, wherein in response to the neighbor network device receiving, within the preset time, the second response message sent by the server and the neighbor network device comprises link aggregation ports, the determining the priority of the neighbor network device comprises:

acquiring a role information of the link aggregation ports by the neighbor network device; and setting the priority of the neighbor network device to the highest priority by the neighbor network device in response to the role information of the link aggregation ports being an authentication access controller.

7. The method according to claim 6, wherein the acquiring the role information of the link aggregation ports by the neighbor network device comprises:

determining a link aggregation group to which the link aggregation ports belong; and acquiring the role information of link aggregation ports in an access state from the link aggregation group.

8. The method according to claim 4, wherein after the priority of the neighbor network device is determined, sending, by the neighbor network device, the second start frame comprising the priority of the neighbor network device to the first network device, or after the setting the priority of the first network device to highest priority by the first network device, receiving, by the neighbor network device, the first start frame comprising the priority of the first network device being the highest priority, sent by the first network device, and sending the second start frame comprising the priority of the neighbor network device to the first network device.

9. The method according to claim 2, wherein in response to the preset condition not being satisfied, the method further comprises:

setting, by the first network device, the priority of the first network device to the initial level, and sending the first start frame to the neighbor network device; and adjusting, by the first network device, the priority of the first network device, and sending the first discovery message to the server, so as to determine the priority of the first network device according to the information comprising the result of connection between the first network device and the server.

10. The method according to claim 1, wherein in response to the first network device receiving, within the preset time, the first response message sent by the server and the first network device comprises link aggregation ports, the determining the priority of the first network device comprises:

acquiring a role information of the link aggregation ports by the first network device; and setting the priority of the first network device to the highest priority by the first network device in response to the role information of the link aggregation ports being an authentication access controller.

11. The method according to claim 10, wherein the acquiring role information of the link aggregation ports by the first network device comprises:

determining a link aggregation group to which the link aggregation ports belong; and acquiring a role information of link aggregation ports in an access state from the link aggregation group.

12. The method according to claim 1, wherein in response to the preset condition being satisfied and the priority of the first network device is equal to the priority of the neighbor network device, the method further comprises:
   determining the role of the first network device as the authentication access controller or the request device by the first network device according to a size relation between the MAC address of the first network device and the MAC address of the neighbor network device.

13. A network device role self-adaptive apparatus, applied to a first network device, comprises:
   a reception unit configured to receive a second start frame sent by a neighbor network device, where the second start frame comprises a priority of the neighbor network device, and the priority of the neighbor network device is determined by the neighbor network device according to information comprising a result of connection between the neighbor network device and a server;
   a determination unit configured to determine whether a priority of the first network device and the priority of the neighbor network devices satisfy a preset condition, wherein the priority of the first network device is determined by the first network device according to information comprising a result of connection between the first network device and the server, and the preset condition comprises the priority of the first network device being a non-initial level and the priority of the neighbor network device being a non-initial level;
   a first determination unit configured to determine a role of the first network device as a request device in response to the preset condition being satisfied and the priority of the first network device being lower than the priority of the neighbor network device; and
   a second determination unit configured to determine a role of the first network device as an authentication access controller in response to the preset condition being satisfied and the priority of the first network device being higher than that of the neighbor network device;
   wherein the apparatus further comprises a sending unit and a setting unit, wherein the determining the priority of the first network device comprises:
   sending a first discovery message to the server by the sending unit;
   repeatedly sending the first discovery message to the server in response to a first response message sent by the server not being received within preset time;
   setting the priority of the first network device to highest priority by the setting unit in response to a first response message sent by the server being received within preset time.

14. The apparatus according to claim 13,
   wherein before the sending a first discovery message to the server by the sending unit, the setting unit sets the priority of the first network device to an initial level, and the sending unit sends a first start frame to the neighbor network device, the first start frame comprising information on the priority of the first network device being the initial level; and
   the setting unit adjusts the priority of the first network device after the sending unit sends the first start frame, and the sending unit sends the first discovery message to the server.

15. The apparatus according to claim 14, wherein after the setting the priority of the first network device to the highest priority by the setting unit, the sending unit sends a first start frame comprising the priority of the first network device being the highest priority to the neighbor network device.

16. The apparatus according to claim 14, wherein in response to the preset condition not being satisfied, the setting unit sets the priority of the first network device to the initial level, and the sending unit sends the first start frame to the neighbor network device; and
   the setting unit adjusts the priority of the first network device after the sending unit sends the first start frame, and the sending unit sends the first discovery message to the server, such that the first network device determines the priority of the first network device according to the information comprising the result of connection between the first network device and the server.

17. A network device role self-adaptive apparatus, applied to a neighbor network device, comprises:
   a sending unit configured to send a second start frame to a first network device; the second start frame comprises a priority of the neighbor network device, the priority of the neighbor network device being determined by the neighbor network device according to information comprising a result of connection between the neighbor network device and a server; the second start frame is used by the first network device to determine whether a priority of the first network device and the priority of the neighbor network device satisfy a preset condition, the preset condition comprising the priority of the first network device being a non-initial level and the priority of the neighbor network device being a non-initial level;
   wherein the apparatus further comprises a reception unit and a setting unit, wherein the determining the priority of the neighbor network device comprises:
   receiving, by the reception unit, a first start frame sent by the first network device, wherein the first start frame comprises information on the priority of the first network device being an initial level:
   setting the priority of the neighbor network device to an initial level by the setting unit in response to the priority of the neighbor network device being the non-initial level after the reception unit receives the first start frame;
   sending a second discovery message to the server by the sending unit;
   repeatedly sending the second discovery message to the server in response to a second response message sent by the server not being received within preset time;
   setting the priority of the neighbor network device to highest priority by the setting unit in response to a second response message sent by the server being received within preset time.

18. The apparatus according to claim 17,
   wherein before the repeatedly sending the second discovery message to the server, the sending unit sends the second start frame to the first network device, the second start frame comprising information on the priority of the neighbor network device being the initial level; and
   the setting unit adjusts the priority of the neighbor network device after the sending unit sends the second start frame, and the sending unit sends the second discovery message to the server.

19. The apparatus according to claim 18, wherein after the priority of the neighbor network device is determined, the sending unit sends the second start frame comprising the priority of the neighbor network device to the first network device, or after the reception unit receives a first start frame which is sent by the first network device and comprises the priority of the first network device being highest priority, the sending unit sends the second start frame comprising the priority of the neighbor network device to the first network device.

* * * * *